US012404151B2

(12) United States Patent
Cowell et al.

(10) Patent No.: US 12,404,151 B2
(45) Date of Patent: Sep. 2, 2025

(54) SYSTEM AND APPARATUS FOR MOVING OBJECTS

(71) Applicant: TREEMAGINEERS LTD, Pitlochry (GB)

(72) Inventors: Christopher Cowell, Pitlochry Perth and Kinross (GB); Elliot Tanner, Montgomery Powys (GB)

(73) Assignee: TREEMAGINEERS LTD, Pitlochry (GB)

( * ) Notice: Subject to any disclaimer, the term of this patent is extended or adjusted under 35 U.S.C. 154(b) by 328 days.

(21) Appl. No.: 17/436,287

(22) PCT Filed: Mar. 5, 2020

(86) PCT No.: PCT/GB2020/050513
§ 371 (c)(1),
(2) Date: Sep. 3, 2021

(87) PCT Pub. No.: WO2020/178580
PCT Pub. Date: Sep. 10, 2020

(65) Prior Publication Data

US 2022/0177280 A1 Jun. 9, 2022

(30) Foreign Application Priority Data

Mar. 6, 2019 (GB) ...................................... 1902979

(51) Int. Cl.
*B66C 21/00* (2006.01)
*A63G 21/22* (2006.01)

(52) U.S. Cl.
CPC .............. *B66C 21/00* (2013.01); *A63G 21/22* (2013.01)

(58) Field of Classification Search
CPC .............. B66C 21/00–10; A63G 21/22; A62B 35/0056; A62B 35/0081; B66D 3/04; B66D 3/046; B66D 3/06
See application file for complete search history.

(56) References Cited

U.S. PATENT DOCUMENTS

| | | | | |
|---|---|---|---|---|
| 2,032,464 A * | 3/1936 | Berger | B66D 3/046 | 384/317 |
| 3,040,678 A * | 6/1962 | McEwen | A63G 21/22 | 104/112 |

(Continued)

FOREIGN PATENT DOCUMENTS

| | | | |
|---|---|---|---|
| CN | 106348183 A * | 1/2017 | B66C 21/10 |
| EP | 3 159 052 | 12/2018 | |

(Continued)

OTHER PUBLICATIONS

International Search Report and Written Opinion of the ISA for PCT/GB2020/050513, mailed May 15, 2020, 14 pages.

*Primary Examiner* — Anna M Momper
*Assistant Examiner* — Nathaniel L Adams
(74) *Attorney, Agent, or Firm* — NIXON & VANDERHYE

(57) ABSTRACT

A trolley for lifting and/or moving a load on lines and an installation and method using it are disclosed. The trolley includes first and second side plates and sheave assemblies. Each sheave assembly includes a sheave axle with an axle shaft projecting from the first plate, a sheave cartridge on the axle shaft between the plates. Each sheave cartridge includes a pulley wheel rotatable on a bearing around an axis of the axle shaft. The axes of the shafts are parallel to one another. Retention fasteners extend thought the second plate to secure the second and first plates through the axle shafts. An installation includes a trolley and main line extending between two fixed anchorages. In use, the main line passes (Continued)

between the plates of the trolley, the main line contacts a sheave or pulley wheel of the trolley whereby the trolley can travel along the main line.

19 Claims, 9 Drawing Sheets

(56) References Cited

U.S. PATENT DOCUMENTS

| | | | | |
|---|---|---|---|---|
| 3,500,764 | A * | 3/1970 | Warman | B66C 21/00 254/303 |
| 4,492,363 | A * | 1/1985 | Niskin | B66D 1/36 254/394 |
| 2005/0218388 | A1* | 10/2005 | Zacharias | B66D 3/046 254/409 |
| 2015/0059611 | A1 | 3/2015 | Brown | |
| 2019/0106123 | A1* | 4/2019 | Cowell | B61B 12/122 |

FOREIGN PATENT DOCUMENTS

| | | |
|---|---|---|
| GB | 2522553 | 7/2015 |
| GB | 2543561 | 4/2017 |

* cited by examiner

SYSTEM AND APPARATUS FOR MOVING OBJECTS

This application is the U.S. national phase of International Application No. PCT/GB2020/050513 filed 5 Mar. 2020, which designated the U.S. and claims priority to GB Patent Application No. 1902979.2 filed 6 Mar. 2019, the entire contents of each of which are hereby incorporated by reference.

BACKGROUND OF THE INVENTION

Field of the Invention

The present invention relates to a system and apparatus for moving objects.

Description of the Related Art

A Tyrolean traverse is performed by connecting a main line between two remote locations across an expanse and placing a carriage on the main line. The carriage has a plurality of sheaves or other low-friction devices that allow it to travel along the main line. Control lines are connected to the carriage to control its movement along the main line. The carriage also has connection points to which a load can be connected. As the control lines are used to move the carriage along the main line, it is possible to move a load connected to the carriage between the remote locations. This arrangement has a variety of applications, including movement of inanimate objects, such as timber from a cut-down tree, or transport of people, either to cross a void, or to rescue an incapacitated person.

EP 3 159 052 discloses a trolley for performing a Tyrolean traverse which is effective and useful. An aim of this invention is to provide a trolley that is easier to use, lighter than existing products and all components are replaceable. A trolley embodying this invention may be simpler or less expensive to manufacture without any reduction in strength and durability.

SUMMARY OF THE INVENTION

To this end, from a first aspect, the invention provides a trolley for lifting and/or moving a load on one or more lines comprising:

- a first side plate and a second side plate and
- a plurality of sheave assemblies;
- in which each sheave assembly includes
  - a sheave axle that includes an axle shaft which projects from the first plate, a sheave cartridge carried on the axle shaft between the plates, wherein each sheave cartridge includes a pulley wheel that can rotate on a bearing around an axis of the axle shaft, and the axes of the shafts being parallel to one another; and
  - retention fasteners that extend thought the second plate to secure the second plate to the first plate through the axle shafts.

The retention fasteners and sheave axles serve to connect the plates together in a strong and solid manner. For installation, free access can be obtained to allow introduction of lines into the trolley by removal of the retention fasteners.

Typical embodiments include three or more (e.g., four) sheave assemblies.

Each sheave cartridge preferably includes a sheave boss that surrounds the sheave axle shaft, and which is clamped between the plates by force applied by the retention fastener. The retention fastener and sheave axle are therefore in tension, which the sheave boss provides structure in compression for reacting the tension in the sheave axle. The boss is generally fixed against rotation with respect to the plates, and preferably also with respect to an inner race of the bearing, while an outer race of the bearing is fixed for rotation with the pulley wheel.

Each sheave axle is preferably secured to the first plate by a releasable fixation fastener. When secured to the first plate, part of the shaft of the sheave axle typically extends through a hole in the first plate and projects from an inner surface of the first plate, and a head of the sheave axle is typically in contact with an outer surface of the first plate. In the latter case, the head is shaped and/or dimensioned such that it cannot pass through the hole in the first plate. When secured to the first plate, axial and rotational movement of the sheave axle with respect to the plate is prevented. Note that removal of the sheave axles from the first plate is not required to gain access to the sheaves.

A trolley assembly embodying the invention may comprise two (or more) interconnected trolleys as defined above, the plates of the trolleys being parallel to one another.

From a second aspect, this invention provides an installation for lifting and/or moving a load that includes a trolley or trolley assembly embodying the first aspect of the invention, a main line that extends between two fixed anchorages, and which, in use, passes between the plates of the trolley, whereby the main line makes contact with one or more sheave or sheave component of the trolley whereby the trolley can be suspended from and travel along the main line.

A typical installation further includes a control line that is connected to the trolley whereby the trolley can be drawn along the main line.

A typical installation further includes a lifting line that passes between the plates of the trolley and over two or more sheaves or sheave components of the trolley, the lifting line carrying, between the sheaves or sheave components, a device such as a pulley for connection with a load.

An alternative installation includes a second lifting line upon which a pulley assembly is carried, the pulley assembly being connected to support the trolley.

One or more fixed lines may be connected to the trolley. These can provide additional lifting capacity, for example serving as a climbing line and a backup line to enable a person to descend and ascend with respect to the trolley, for example to accompany a person being rescued.

From a third aspect, this invention provides a method of installing an installation according to the second aspect of the invention comprising:

a. installing a main line between two fixed anchorages;

b. removing the retention fasteners and removing the second plate;

c. replacing the second plate having enclosed part of the main line between the plates and at least a pair of sheave assemblies.

Typically, prior to step c., part of a lifting line may be passed between the plates of the trolley.

BRIEF DESCRIPTION OF THE DRAWINGS

Embodiments of the invention will now be described in detail, by way of example, with reference to the accompanying drawings, in which.

DESCRIPTION OF THE PREFERRED EMBODIMENT

With reference to the drawings, a trolley for use in performing a Tyrolean traverse comprises first and second side plates 10, 12 of similar peripheral size and shape. The side plates 10, 12 are formed from a suitable load-bearing material such as an alloy, stainless steel or composite material. In an orientation in which the trolley will typically be used, the plates are an approximate inverted U-shape. The plates are symmetrical about a median axis A (shown in FIG. 12) with first and second legs to opposite sides of the axis A and a recess defined between the legs. Various holes are formed in the plates, each hole, in the assembled trolley, being in alignment with a corresponding hole in the other plate.

Figure 1:
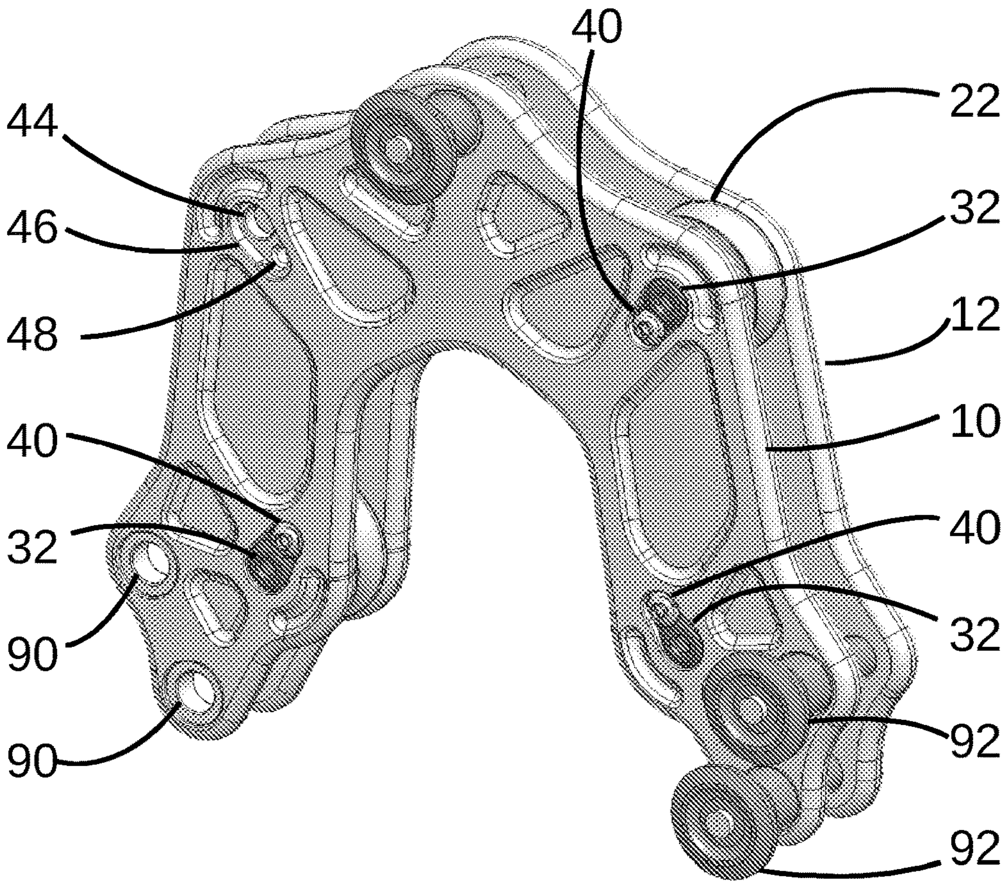
FIGS. 1 and 2 show a trolley embodying the invention.
Figure 2:
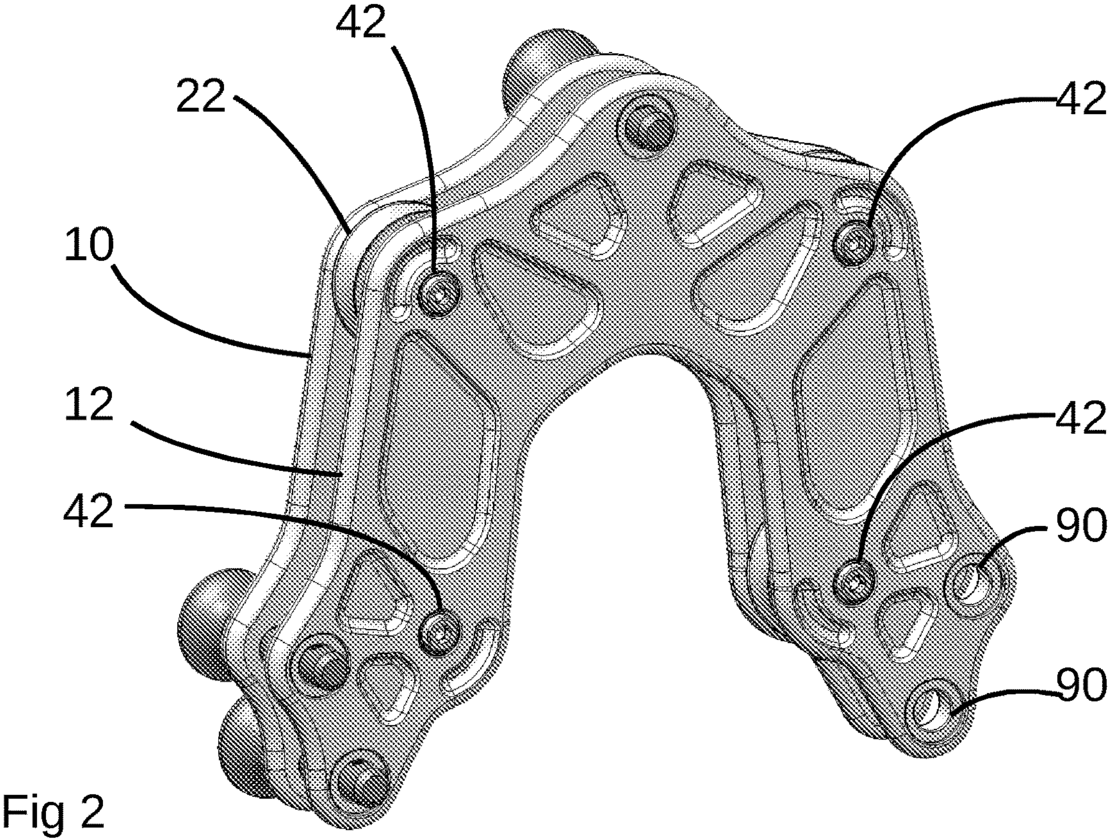
Figure 3:
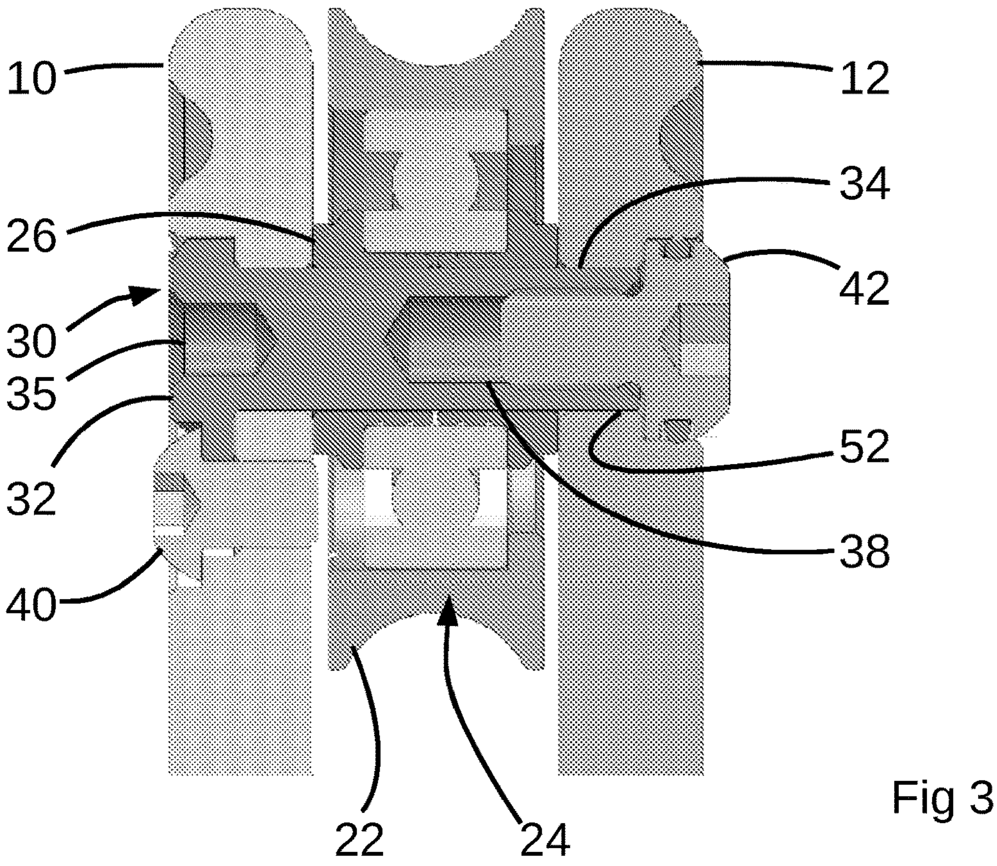
FIG. 3 is a cross-section of part of the embodiment of FIGS. 1 and 2.

The trolley further includes four sheave assemblies, one of which is shown in detail in FIG. 3. The sheave assemblies are disposed at the vertices of a rectangle that is symmetrical about the median axis forming an upper pair of sheave assemblies and a lower pair of sheave assemblies. One of the upper sheave assemblies has been omitted from FIG. 1 to illustrate features that would otherwise be hidden.

Each sheave assembly includes a sheave cartridge 20 that comprises a pulley wheel 22 carried on a rolling element bearing 24. An outer race of the bearing 24 rotates with the pulley wheel 22 and an inner race of the bearing 24 is carried on and a sheave boss 26. The sheave boss 26 has a central cylindrical bore centred on the axis of rotation of the pulley wheel 22.

Each sheave assembly further includes a sheave axle 30. The sheave axle 30 has a cylindrical shaft 34 at one end of which is a head 32. The shaft 34 is dimensioned to be a close fit within the bore of the sheave boss 26. The head 32 extends radially from the shaft 34 and has a projecting region that has a part-circular notch 36 formed in a radially-outward-facing surface. A coaxial tapped bore 38 is formed into the shaft 34 from its end opposite that of the head 32. A further coaxial blind hole 35 may be formed through the head 32.

Each sheave assembly includes a fixation bolt 40 and a retention bolt 2, the purpose of which will be described below.

Assembly of the trolley proceeds in stages as will now be described.

A: The shaft 34 of the sheave axle 30 is inserted through a hole 44 in the first plate. The hole 44 is surrounded by a recess 46 that extends radially from the hole 44, the head 32 of the axle 30 being received within the recess 46. The shapes and sizes of the head 32 and the recess 46 are such that the head 32 is a close fit within the recess 46 to substantially prevent rotation of the axle 30 about its shaft 34. When in position in the recess 46 the part-circular notch 36 is formed in an outer surface of the plate which surrounds a tapped hole 48 that passes through the first plate 10. A fixation bolt 40 is threaded into the tapped hole 48 such that its head bears against the head 32 of the sheave axle 30 adjacent to the notch 36 and on a land 50 that partially surrounds the tapped hole 48. Thus, the sheave axle 30 is prevented from rotating with respect to the first plate 10 by interaction between its head 32 and the recess 46 and is also prevented from sliding axially from the plate 10 by the fixation bolt 40.

Figure 4:
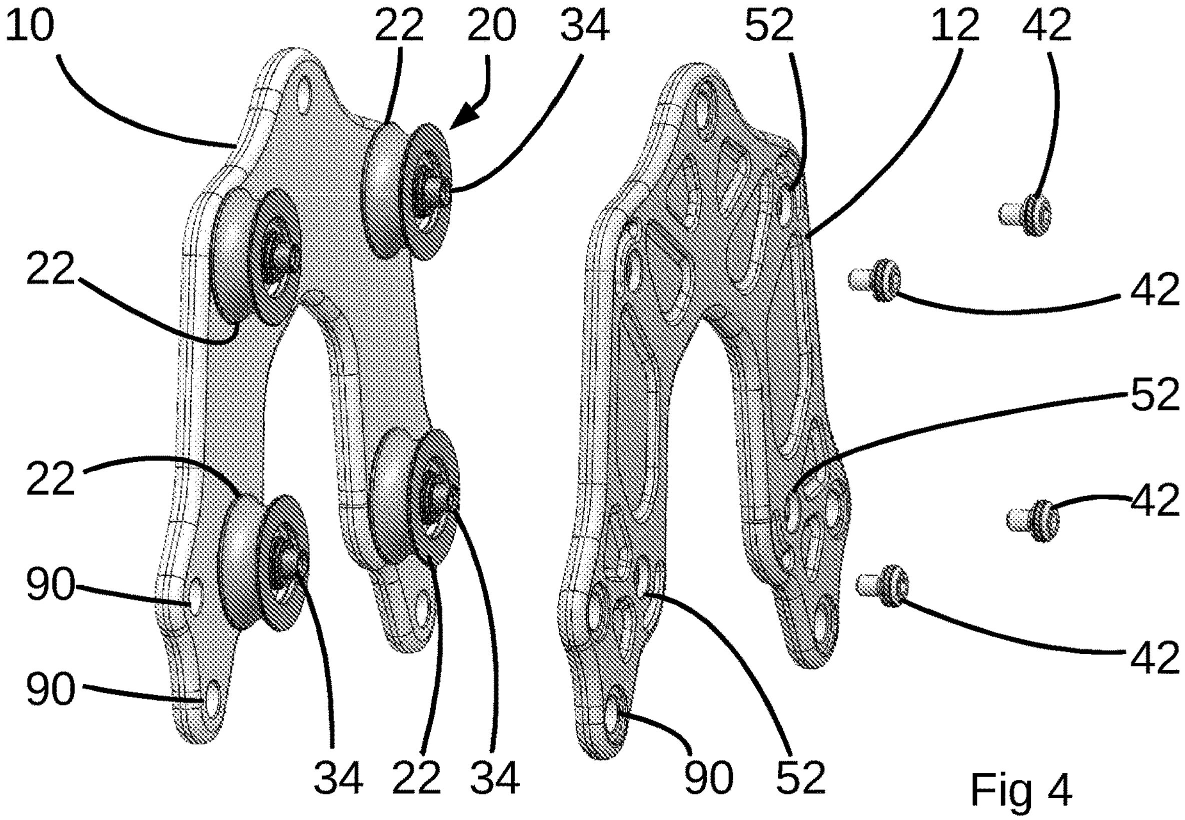
FIG. 4 shows the embodiment of FIGS. 1 and 2 dismantled for installation of working and lifting lines.

B: The sheave assembly is further assembled by sliding the sheave cartridge 20 onto the shaft 34 of the sheave axle 30 such that its sheave boss 26 bears against an inner surface of the first plate 10. This is repeated for all four sheave assemblies. This intermediate stage of assembly is shown in FIG. 4.

C: The second plate 12 is then placed such that an end portion of each shaft 34 passes into a respective hole 52 in the second plate 12 until an inner surface of the second plate 12 bears against the sheave bosses 26. Each hole 52 in which a shaft is received is counterbored from an outer surface of the second plate. The second plate 12 is retained in place by passing one of the retention bolts 42 into each of the holes such that is shaft 62 is threaded into the tapped bore 38 of the sheave axle 30. The head 60 of the retention bolt can fit within a counterbored cavity of the hole 52 but not into the part that is not counterbored, whereby the head can clamp the second plate 12 against the sheave boss 26 as the bolt is tightened.

During the stage of assembly described in the last-preceding paragraph, movement of the sheave axles 30 is prevented by the fixation bolts. This allows this stage of assembly to be performed using a single tool to tighten the retention bolts 42: there is no need to use a tool on the axle 30 or the fixation bolt 40.

Figure 11:
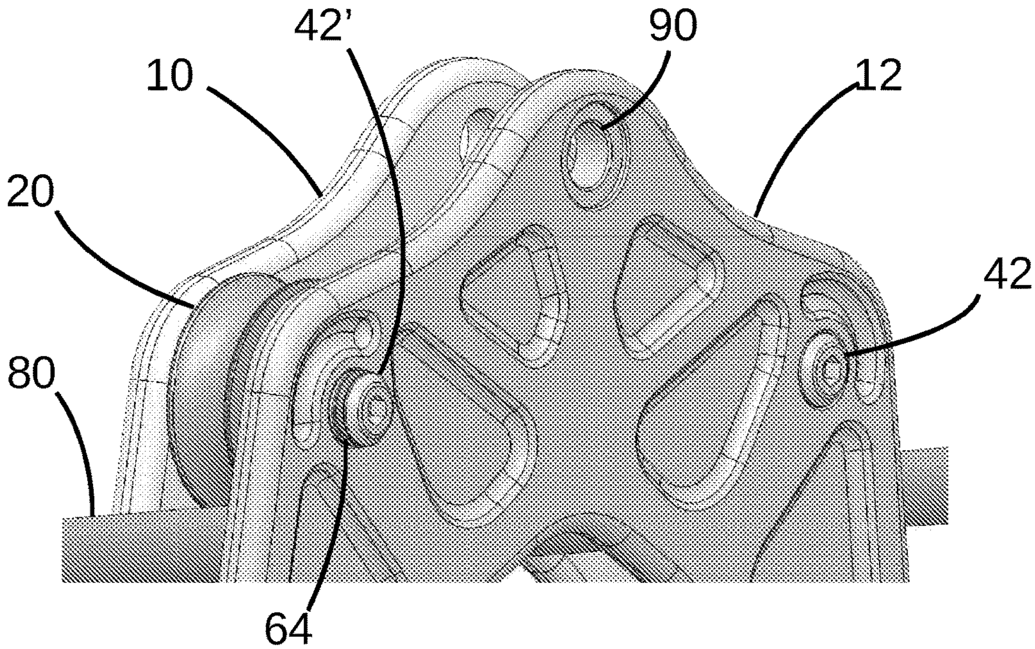
FIG. 11 shows the embodiment of FIGS. 1 and 2 with one retention bold partially unfastened.

The head 60 of each retention bolt has a circumferential groove within which an O-ring 64 is located. The O-ring 64 serves two purposes: when the retention bolt 42 is tight, it is compressed between the head 60 and the counterbored cavity to resist rotation of the retention bolt 42 against unintended loosening; and it provides a visible indication of the retention bolt 42' being insufficiently tightened, as shown at the left-hand side of FIG. 11, by remaining visible from the exterior of the plate 12. To enhance performance of the latter purpose, the O-ring 64 is preferably brightly coloured—for example, coloured red.

In the event that a retention bolt 42 is omitted or becomes loose, the axle 30 will not be lost, because the fixation bolt 40 will prevent its removal from the first plate. The retention bolts 42 of the other sheave assemblies maintain the overall structural integrity of the trolley, and while it is believed that the strength of the trolley would not be significantly affected if one of the retention bolts were not tightened correctly or were missing entirely, this is an undesirable situation that is to be avoided if possible.

Each plate 10, 12 includes a plurality of additional pairs of circular mounting holes 90. Each pair of mounting holes 90 can receive a removable pin 92, which locks into place in the holes until it is released by a user-operated trigger.

When not in use, each retention bolt can be inserted into a blind hole e.g. 35 in the head 32 of the sheave axle 30.

Assembly of a complete installation for moving items using the trolley describe above will now be described.

In addition to the trolley, the installation comprises several lines formed from ropes or cables. These are:

"main line": a line that bears the majority of the load and that allows the trollet to move in a transverse direction across an expanse to be crossed. The main line is typically fixed at opposite sides of the expanse during use.

"lifting line": this is also load-bearing but is controllable by the user to raise or lower the load independently of the main line. The lifting line may be fixed at one side and adjustable in length at the other side of the expanse during use, or it may be adjustable at both sides.

"control line": causes movement and control of the trolley back and forth along the main line. It is fixed to the trolley. This line could be controlled by the user using a device that provides mechanical advantage (e.g., a pulley system) or may be under powered control (e.g., using a winch).

A typical sequence of assembly is as follows:

The main 80 line and the lifting line 82 are installed across the expanse.

Figure 5:
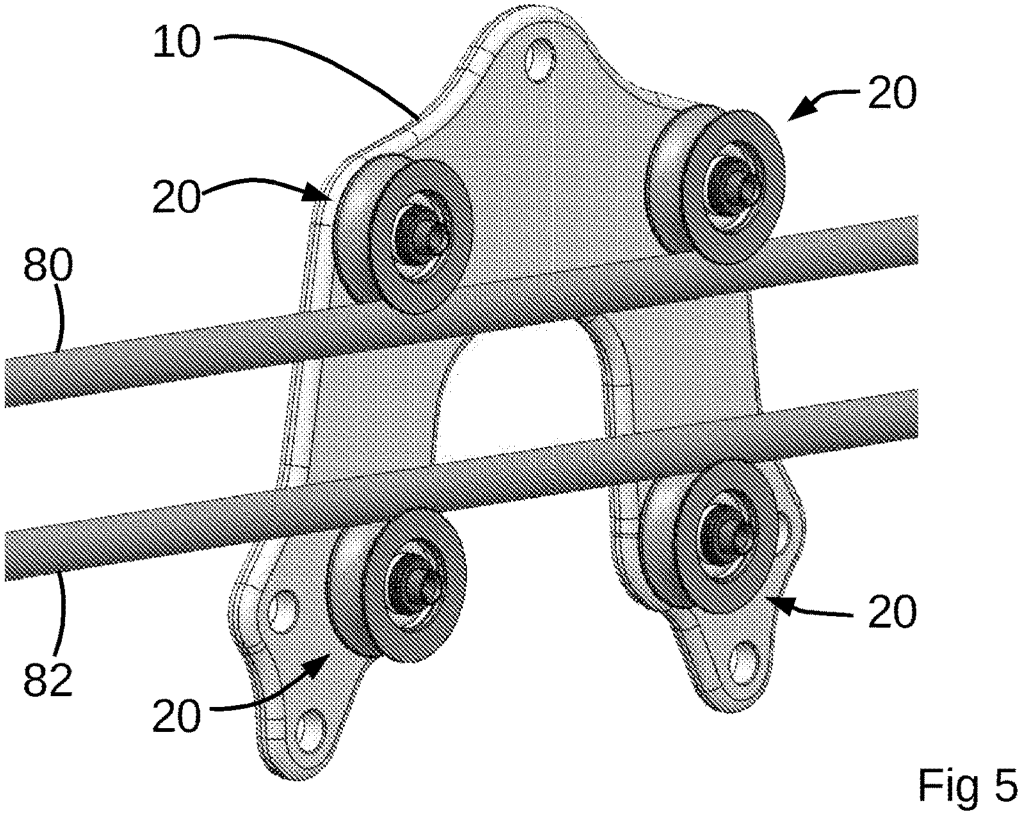
FIG. 5 shows an intermediate stage of the embodiment of FIGS. 1 and 2 being installed on working and lifting lines.
Figure 6:
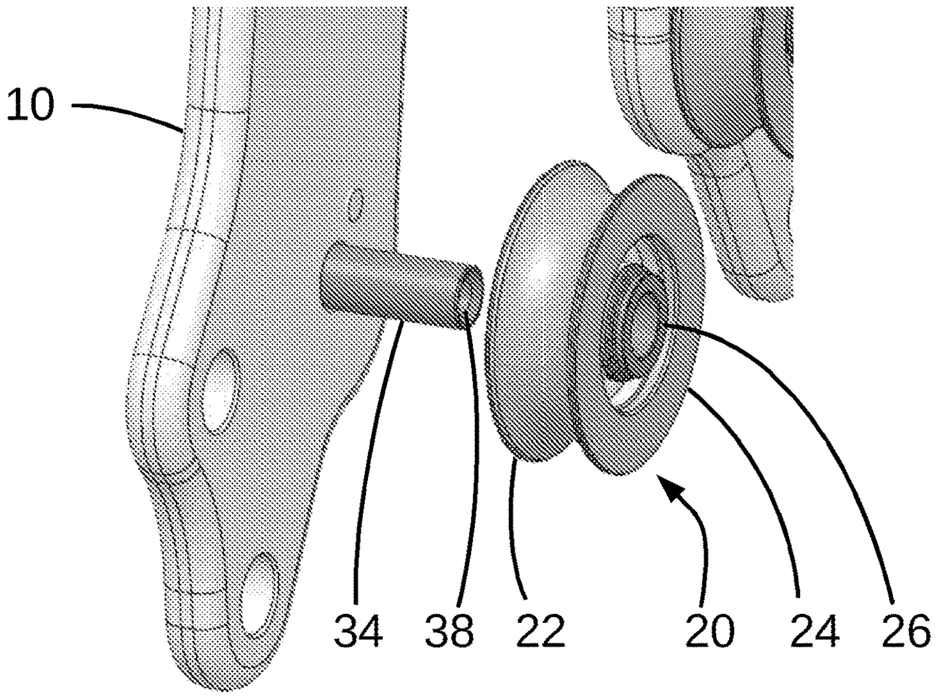
FIGS. 6, 7 and 8 show details of an arrangement for mounting a sheave in the embodiment of FIGS. 1 and 2.
Figure 7:
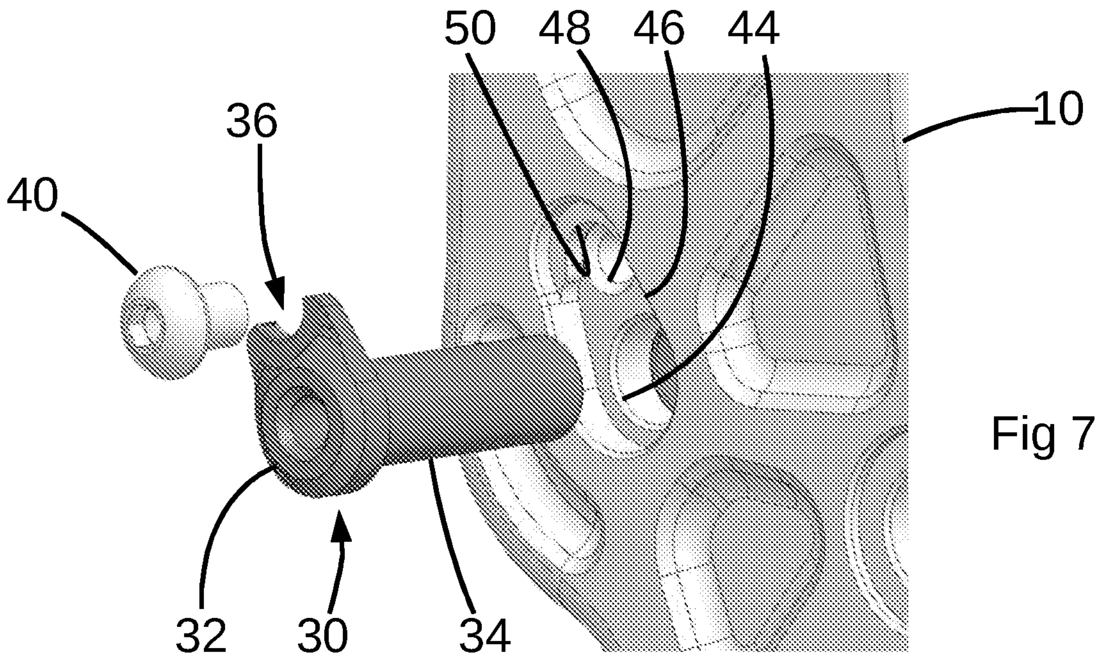
Figure 8:
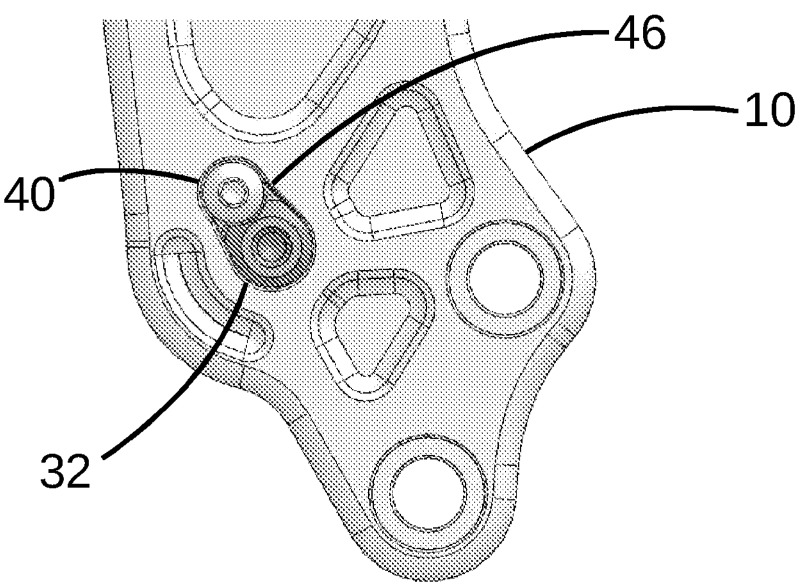
Figure 9:
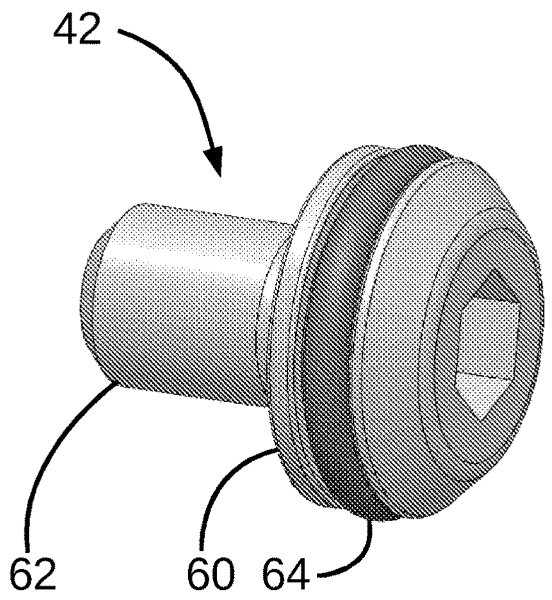
FIGS. 9 and 10 show a retention bolt and a sheave axle in the embodiment of FIGS. 1 and 2.
Figure 10:
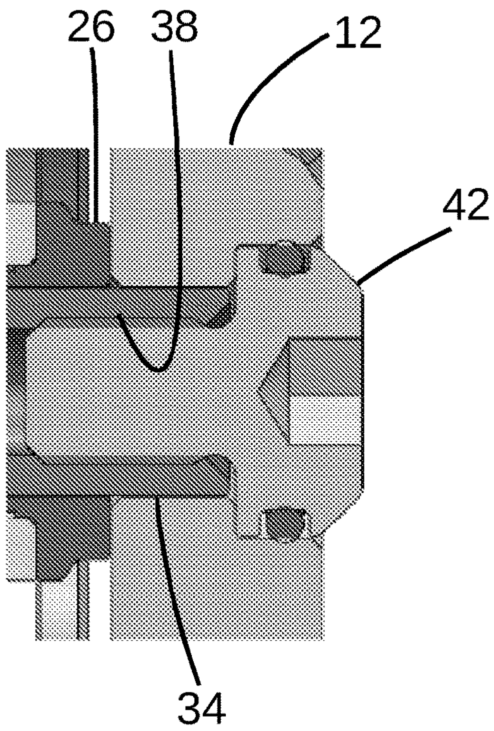

The trolley is partially assembled as described in stages A and B above, to achieve the arrangement shown in FIG. 5.

The first plate 10 is placed adjacent to the main line 80 and the lifting line 82 such that the lines pass between the upper and lower pairs of sheave assemblies, and the second plate 12 is then installed as described in paragraph C above.

A pulley block 86 is attached to the lifting line 82 between the lower pair of sheave assemblies.

A control line is connected to a pin 92 inserted into a pair of mounting holes 90.

Figure 12:
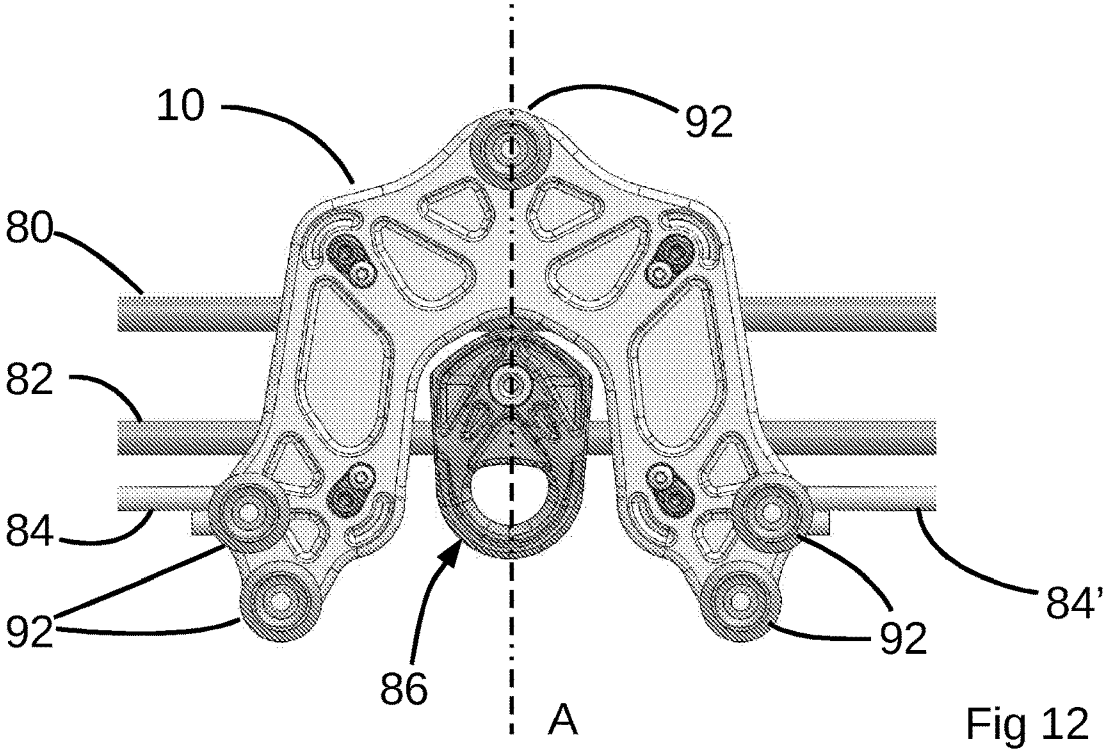
FIG. 12 shows the embodiment of FIGS. 1 and 2 installed for use.
Figure 13:
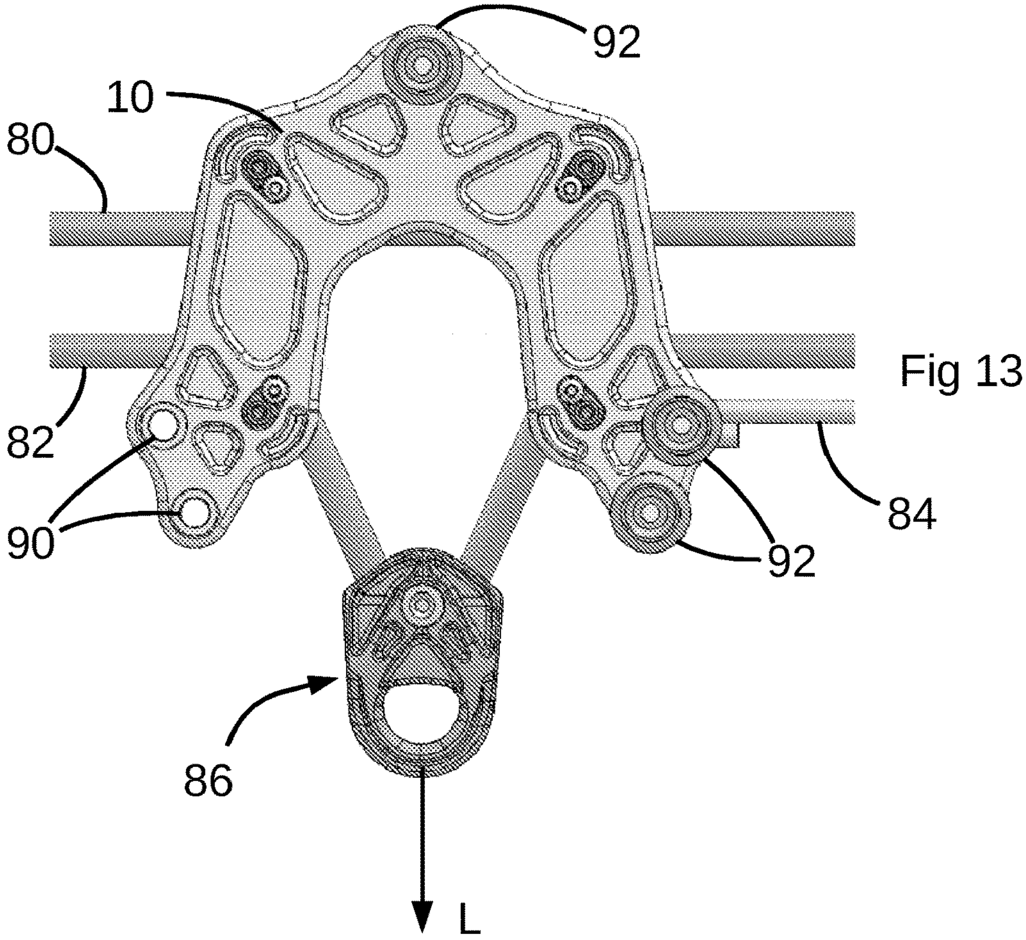
FIG. 13 shows the embodiment of FIGS. 1 and 2 being used in a lifting operation.

Slackening or loosening the lifting line 82 causes a load L attached to the pulley block 86 to be lowered or raised with respect to the trolley. As shown in FIG. 12, in a raised position, the pulley block 86 is received within the recess between the legs of the trolley. When the pulley block 86 is in this position, the lifting line passes 82 through the trolley along an approximately straight path, which minimises friction arising from movement of the trolley.

In installations where the main line 82 is sloping, one control line 84 can be used to pull the trolley in an upward direction on the main line 80 or released in a controlled manner to cause the trolley to move in a downward direction along the main line 80 under the action of gravity. Where there is no overall slope, two control lines 84, 84' may be provided to pull the trolley in opposite directions along the main line 80.

Figure 14:
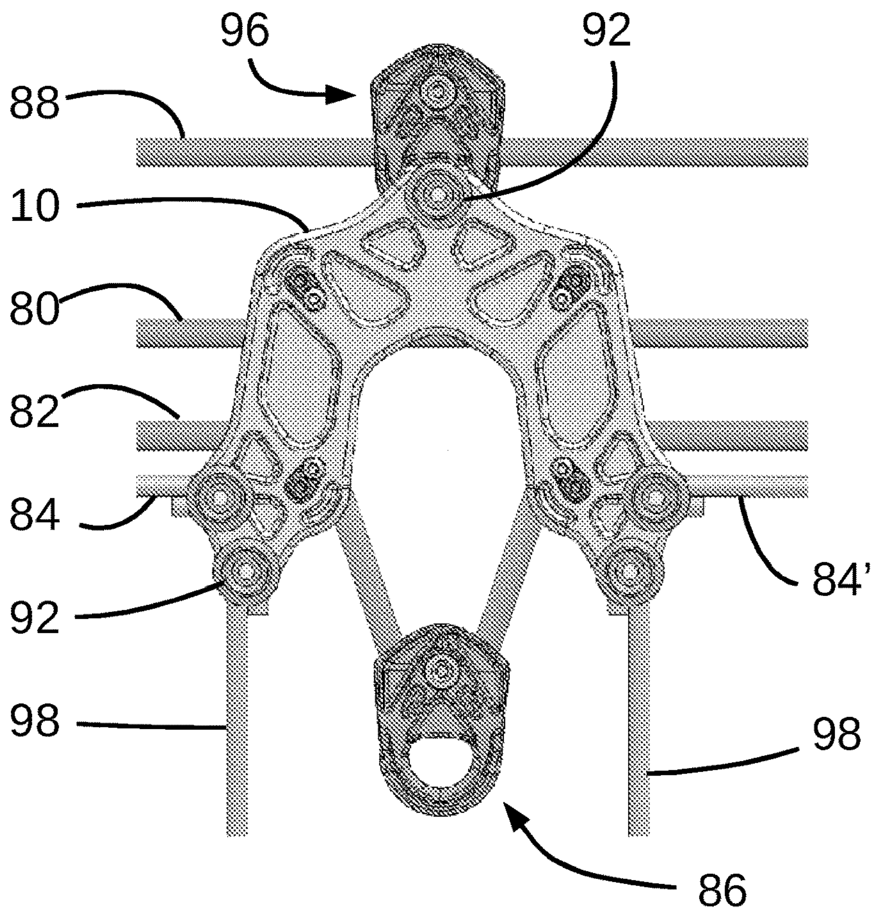
FIG. 14 shows the embodiment of FIGS. 1 and 2 installed on multiple redundant main lines.

The arrangement of FIG. 14 uses the same trolley described above. Series redundancy is created by providing an additional main line 88. An additional pulley assembly 96 is carried on the additional main line 88 and connected to the trolley using a pin 92 inserted into a pair of mounting holes 90 towards the top of the plates 10, 12. In that way, should the main line 82 fail, the additional main line serves as a backup to prevent loss of a load being carried. This arrangement can be used with a single control line 84 or two control lines 84, 84' as needed.

Also shown in this embodiment are additional lines 98 that can be used to carry a load. These are fixed lines that are each secured to the trolley using a pin 92 inserted into a pair of mounting holes 90 towards the bottom of the plates 10, 12. A typical use for these fixed lines 98 would be to allow a person to accompany a load, such as an injured person, being lifted on the pulley block 86. In such an application, one of the fixed lines 98 would be used as a climbing line upon which a climber could move using an ascender, and the other fixed line 98 would be used as a back-up line to protect the climber against failure of the climbing line and associated apparatus.

Figure 15:
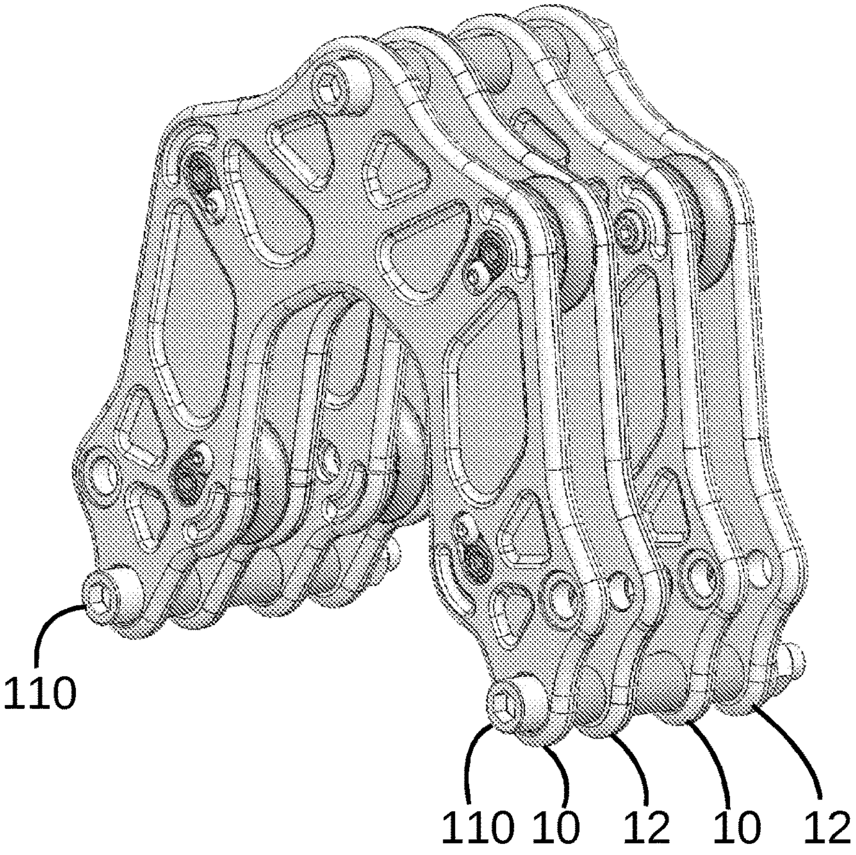
FIGS. 15 and 16 are perspective and part cross-sectional views of a second embodiment of the invention.
Figure 16:
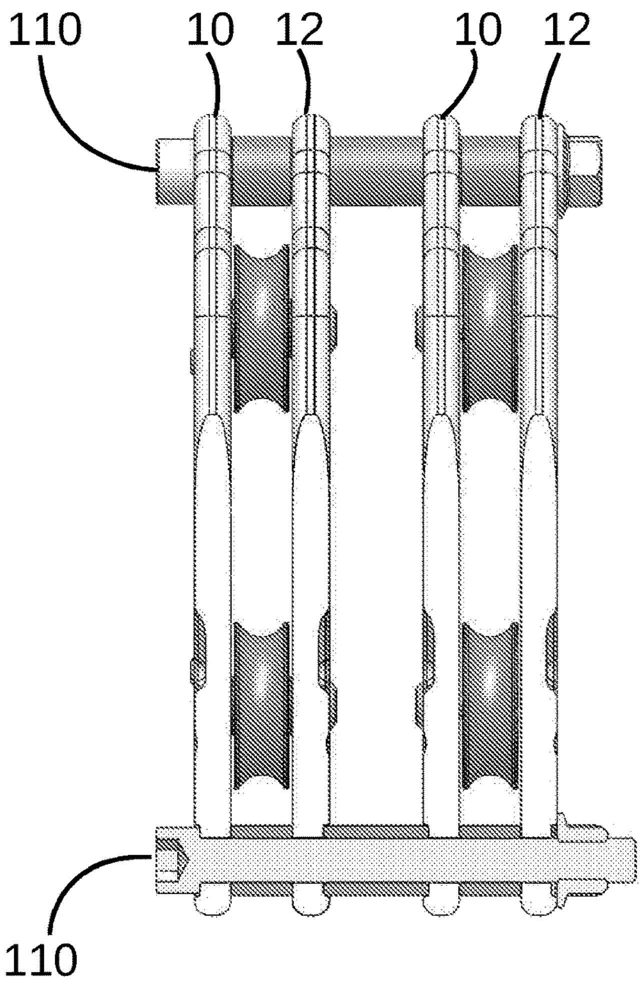

A trolley as described above could be paired, as shown in FIGS. 15 and 16, with another identical trolley to create a system which has theoretically twice the strength and lifting capacity as that described above, but most importantly for some users gives redundancy in the system and a backup device through a parallel redundancy system. Using such a trolley, each line and piece of equipment being part of an installation can be duplicated to provide redundancy and therefore protect against failure of multiple components in the installation. Two trolleys are joined together using long bolts 110 and spacers through the first and second plates 10, 12.

Figure 17:
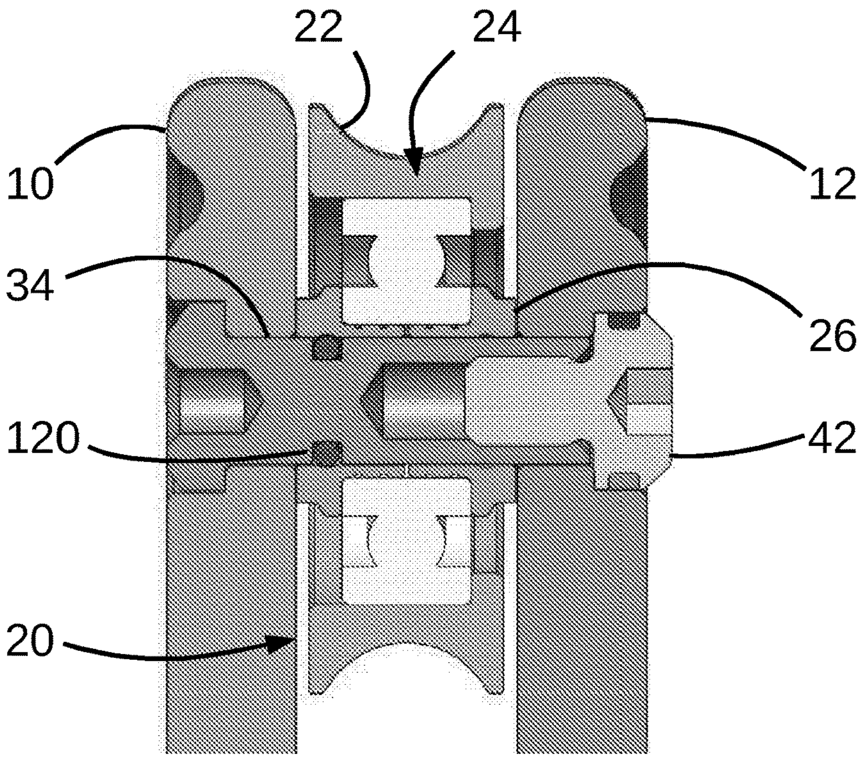
FIG. 17 shows a modification to a sheave assembly of the embodiment of FIGS. 1 and 2.

While stage B of the assembly sequence described above is being performed, the sheave cartridges 20 have been slid onto the shafts 34 of the sheave axles 30, but they are not retained there, which means that they could slide off and potentially become lost. To minimise the risk of this happening, in a modification of the above-described embodiment shown in FIG. 17, a circumferential groove is formed on the shafts 34 of the sheave axles 30 and an O-ring 120 is retained in the groove. The sheave boss 26 is gripped by the O-ring 120 with sufficient force that it will not fall off the shaft 34 accidentally under the weight of the sheave assembly, but such that it can be removed using light manual effort when required.

Figure 18:
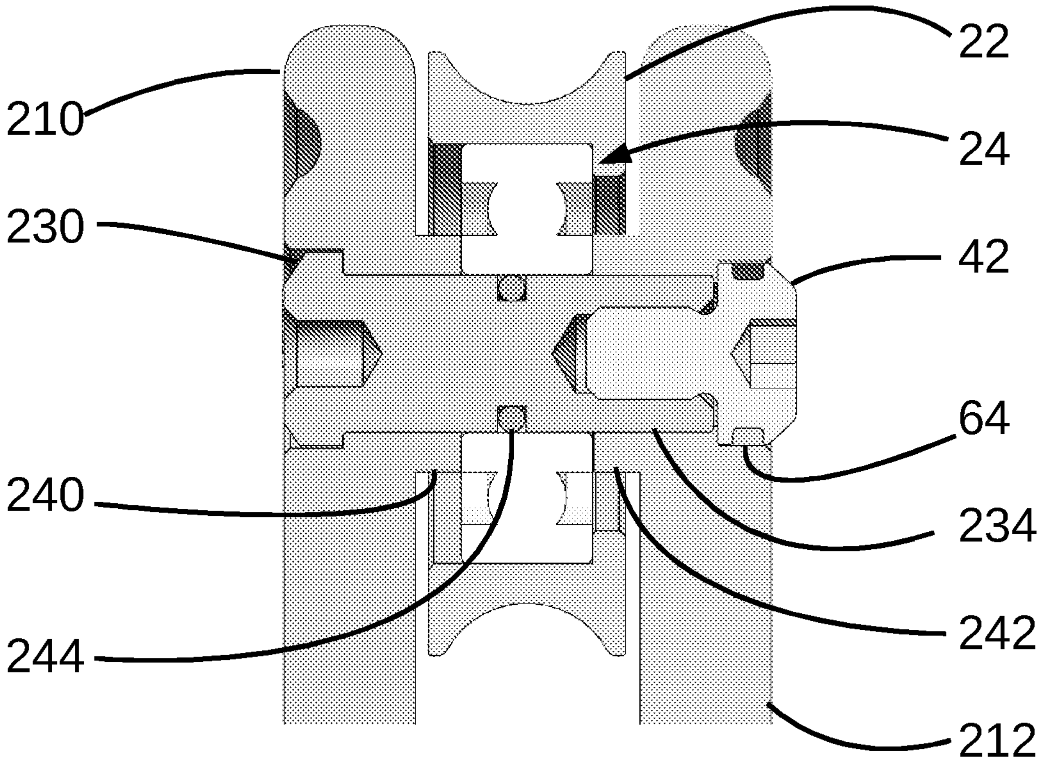
FIG. 18 shows a second modification to a sheave assembly of the embodiment of FIGS. 1 and 2.

A further alternative configuration of the sheave assembly is shown in FIG. 18. In this arrangement, there is no sheave boss 26, and the inner race of the bearing 24 is carried directly upon the shaft 234 of the sheave axle 230. As compared with the arrangement described above, the shaft 234 of the sheave axle 230 is of larger diameter so that the size of the bearing 24 can remain unchanged. Axial location of the bearing 24 on the axle 230 is provided by annular abutments 240,242 that project from the first and second plates 210, 212. The abutments 240,242 closely surround the shaft 234 of the sheave axle 230, and make contact with opposite side faces of the inner race of the bearing 24 to prevent it moving axially along the shaft 234, and thereby preventing axial movement of the pulley wheel 22.

An O-ring 244 is located in a groove formed on the shaft 234 of the sheave axle 230 at a position that is radially inward of the inner race when the bearing 24 is in is operational position on the shaft 234. As with the previous embodiment, the inner race of the bearing 24 is gripped by the O-ring 244 with sufficient force that it will not fall off the shaft 234 accidentally, but such that it can be removed manually when required.

The invention claimed is:

1. A trolley for lifting and/or moving a load on one or more lines comprising:

a first side plate and a second side plate; and a plurality of sheave assemblies in which each sheave assembly includes a sheave axle that includes an axle shaft which projects from the first plate and passes into a hole in the second plate, wherein the sheave axle is in tension between the plates, and a sheave cartridge carried directly on the axle shaft between the plates, wherein each sheave cartridge includes:

a pulley wheel rotatable on a bearing around an axis of the axle shaft; and a removable retention fastener that extends through the hole in the second plate to engage directly with the axle shaft to removably secure the second plate to the first plate via the axle shaft, wherein the axes of the axle shafts of the plurality of sheave assemblies are parallel to one another, wherein the sheave axle is secured to the first plate by the releasable fixation fastener with axial and rotational movement of the sheave axle with respect to the first plate being prevented, and wherein removal of the sheave axle from the first plate is not required to gain access to each sheave assembly.

2. The trolley according to claim 1 that includes three or more sheave assemblies.

3. The trolley according to claim 2, wherein each sheave cartridge includes a sheave boss that surrounds the sheave axle shaft, and which is clamped between the plates by force applied by the retention fastener.

4. The trolley according to claim 1, wherein each sheave cartridge includes a sheave boss that surrounds the sheave axle shaft, and which is clamped between the plates by force applied by the retention fastener.

5. The trolley according to claim 3, wherein the sheave boss provides a structure that can be loaded in compression to counter react the tension force in the sheave axle.

6. The trolley according to claim 4, wherein the boss is fixed against rotation with respect to the plates, and with respect to an inner race of the bearing of the sheave cartridge, while an outer race of the bearing is fixed for rotation with the pulley wheel.

7. The trolley according to claim 1, wherein part of the shaft of the sheave axle extends through a hole in the first plate and projects from an inner surface of the first plate.

8. The trolley according to claim 1, wherein a head of the sheave axle is in contact with an outer surface of the first plate.

9. The trolley according to claim 8, wherein the head is shaped and/or dimensioned such that the head cannot pass through a hole in the first plate.

10. A trolley assembly, the trolley assembly comprising two trolleys according to claim 1, the two trolleys being interconnected with the plates of the trolleys being parallel to one another.

11. An installation for lifting and/or moving a load, comprising a trolley according to claim 1, and a main line that extends between two fixed anchorages, and which, in use, passes between the plates of the trolley, whereby the main line makes contact with one or more sheave or sheave component of the trolley whereby the trolley can be suspended from and travel along the main line.

12. The installation according to claim 11, further comprising a control line that is connected to the trolley whereby the trolley can be drawn along the main line.

13. The installation according to claim 11, further comprising a lifting line that passes between the plates of the trolley and over two or more sheaves or sheave components of the trolley, the lifting line carrying, between the sheaves or sheave components, a device for connection with a load.

14. The installation according to claim 13, wherein the device for connection with a load includes a pulley.

15. The installation according to claim 11, further comprising a second lifting line upon which a pulley assembly is carried, the pulley assembly being connected to support the trolley.

16. The installation according to claim 11, further comprising one or more fixed lines connected to the trolley.

17. A method of installing an installation according to claim 11, the method comprising:

installing the main line between two fixed anchorages;

removing the retention fasteners and removing the second plate; and replacing the second plate having enclosed part of the main line between the plates and at least a pair of sheave assemblies.

18. The method according to claim 17 further comprising, prior to the step of replacing the second plate, passing part of a lifting line between the plates of the trolley.

19. The trolley according to claim 1, wherein the bearing has an outer race and an inner race, the inner race mounted on the axle shaft, and wherein the pulley wheel is carried on the outer race of the bearing around an axis of the axle shaft, the outer race rotating with the pulley wheel and the inner race being carried on a sheave boss.

* * * * *